March 3, 1953 H. SHEFFER ET AL 2,630,042
DIFFERENTIAL REFRACTOMETER
Filed Nov. 7, 1950 2 SHEETS—SHEET 1

INVENTORS
HENRY JOHN HADOW
HARRY SHEFFER
JOHN COLIN HYDE
BY Bailey, Stephens & Huettig
ATTORNEYS Patented Mar. 3, 1953

2,630,042

UNITED STATES PATENT OFFICE 2,630,042

DIFFERENTIAL REFRACTOMETER

Harry Sheffer and John Colin Hyde, Ottawa, Ontario, Canada, and Henry John Hadow, Stratford Sub Castle, near Salisbury, England, assignors to Her Majesty the Queen in the right of Canada, as represented by the Minister of National Defence, Ottawa, Ontario, Canada Application November 7, 1950, Serial No. 194,422

1 Claim. (Cl. 88—14)

This invention relates to a refractometer and in particular to a differential refractometer for finding the difference in the refractive indices of two liquids which obtains a greater measure of accuracy than existing devices by supplying a larger number of refracting interfaces.

Differential refractometers are known which have in plan view a rectangular solvent cell and a triangular solution cell contained therein. The triangle has its base on the long side of the rectangle and has roughly the same height as the width of the rectangle. The ray of light entering the cell parallel to the long side of the rectangle and the base of the triangle, is refracted at two solution-solvent interfaces. In this way the slight bending of the beam due to the difference in refractive indices takes place twice and the measurable deflection is increased. An instrument designed according to this principle is sufficiently accurate for most uses. However for certain solutions the difference in refractive indices between solution and solvent is sufficiently small that the above described instrument has not the sensitivity to give accurate results.

It is the object of this invention to provide a differential refractometer having greater sensitivity, than hitherto.

It is the further object of this invention to provide a differential refractometer having greater sensitivity, than hitherto by provision of a compact liquid refracting area and a compact device which embodies the optical lever principle.

The device embodying this invention provides four interfaces which are cut obliquely by a light ray and the light ray thereby bent at each of the four interfaces due to the difference in refractive indices on each side of the interface, the device being so constructed that this bending is additive, so that a greater angular deflection and consequent greater sensitivity is obtained with this device than with instruments up to this time.

The invention does not however lie alone in the provision of four interfaces since this would be easily attainable by several types of sufficiently elaborate apparatus, but lies in providing a simple construction which uses a minimum of the scarcer liquid. Furthermore the device is so designed that the bending which takes place at the interfaces is additive.

If a light ray strikes the interface between two materials of different refractive indices, bending takes place unless the direction of the ray is normal to the interface. If the light ray passes from one liquid to another with the interface sloped in one direction relative to the normal it is bent in a certain sense of rotation. If the ray then goes from the second liquid to the first through a second interface, sloped in the opposite direction relative to the normal, bending again takes place which is in the same sense of rotation as the first bending. This much is achieved by the prior art devices disclosed above.

The ray having thus been twice refracted, leaves the liquid region, is reversed and displaced, re-enters the liquid region and is twice more refracted at the other two interfaces, the placing of the liquids and the slopes of these interfaces being such that the second series of bendings is additive to the first. The idea of reversing and displacing the light ray half way through the bending operation allows the apparatus, which permits this additive bending, to be made compactly and simply.

By providing an outer cell having the faces, through which the ray passes, normal to the ray, and placing therein an inner cell having four faces which are intersected by the ray at angles alternately on opposite sides of the normal, it is seen that if two liquids (the difference of whose refractive index it is desired to find) are placed respectively in the inner and outer cells, the ray will pass alternately from mediums of higher to lower and from mediums of lower to higher refractive index. Thus the bending of the ray at the interfaces will be additive.

The embodiment of the invention specifically described below utilizes an inner cell having the shape of a rhombus substantially parallel to the long side of a rectangular outer cell. A light ray from a source passes through two interfaces which in plan define one of the obtuse angles of the rhombus in a direction roughly parallel to the long diagonal of the rhombus and on being reversed and displaced by being doubly reflected, passes similarly through the other two interfaces, and leaves the composite cell for measurement of the total refraction.

Although the rhombus shape is shown specifically and was chosen for facility of manufacture and ease of construction, it will be obvious that several other shapes will give the same effect and utilize the essential features of this invention, since the invention is directed to a refractometer so constructed that the light from the source intersects two oppositely sloped faces in passing through the composite cell, is then reversed and displaced by double reflection, and intersects two more oppositely sloped faces in returning through the composite cell.

It will be seen that the solution could be placed in either the inner or outer cell and the solvent in the other cell without departing from the essence of the invention, although the sense of additive bending will be reversed having regard to appropriate measurement of the additive bending. The rhombus is made small in relation to the outer cell to reduce the quantity required of the less available liquid.

Another inventive feature is disclosed wherein the refractive effects are magnified by combining the cell described above with a compact device embodying the optical lever principle which adds to the sensitivity of the instrument as a whole.

This latter device obtains the advantages accruing from the use of an optical lever without necessitating the space usually required by such devices by providing two parallel mirrors between which the ray is several times reflected and thus travels the long optical path length between the two mirrors so that the instrument as a whole may be made very compactly.

The invention will now be described in detail with reference to the attached drawings in which.

Figure 1:
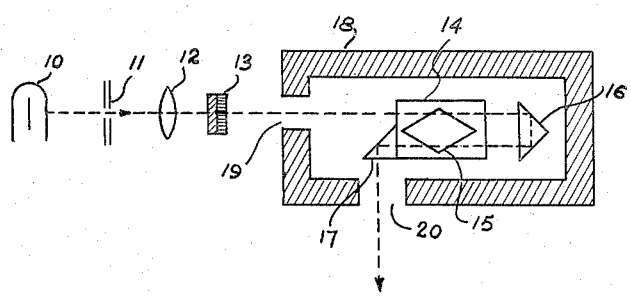
Figure 1 shows a plan view of the invention and the apparatus used therewith.

The source 10 may be any lamp which emits a widely spaced spectrum of strong wavelengths. The reason that the wide spacing is desirable is so that the monochromatic light may be obtained by the use of filters. The source may be, for example a mercury or sodium lamp. Light from the source 10 is passed through a small adjustable slit 11 which allows diverging light to fall on a lens 12 which is so placed so that the emergent rays are parallel. In line with source, slit and lens is a filter or combination of filters 13 which removes the unwanted wave lengths from the light beam thus supplying substantially monochromatic light. (In the case of a mercury lamp in order to use the 5461 A. line, a filter such as that known by trade name Corning No. 3484 is used to eliminate all wave lengths below 5200 A. and in combination with this, a filter known by the trade name Corning No. 5120 is used to eliminate the strong band at 5770 A. In order to obtain the 4358 A. line, filters known by the trade name of Corning Nos. 5113 and 3389 are used.)

An outer cell 14 of rectangular shape encloses an inner cell 15 therein, both cells having horizontal top and bottom walls which may be common to both cells, the long sides of the outer cell being parallel to the optical path delineated by the arc, slit, lens and filter before described, but the center line of the inner cell is below the optical path delineated (using the orientation of Figure 1). The inner cell 15 has the shape of a rhombus with its long diagonal parallel to the aforementioned optical path and is centrally disposed in the outer cell. The outer cell is constructed of glass while the inner cell is constructed of metal e. g. stainless steel having holes to allow passage of the light along the paths described herein and having glass windows cemented over the holes.

The stainless steel construction of the inner cell provides a separating surface of high heat conductivity whereby the liquids in the inner and outer cells tend to rapidly reach temperature equilibrium, temperature equilibrium being very important in the measurement of refractive index difference.

If aqueous solutions are to be used in the measurements of refraction there are many cements which may be used, but for organic solvents many of these cements are unsatisfactory and it is suggested that a cement made of gum arabic, sucrose and water be used.

The rhombus is herein disclosed as having obtuse corners of 130° and acute corners of 50° but it will be seen that many other angles could be used and still fall within the ambit of this invention.

A 45° prism 16 has its large face parallel to the end wall of the rectangle delineated by the outer cell in Figure 1 and with the right angled edge of the prism 16 lying in the same vertical plane as the center line of the outer cell, said right angled edge being on the side of the large face farthest from the outer cell.

The essential elements of the invention so far described are the composite cell composed of outer cell 14 and inner cell 15 and prisms 16 and 17. These components are mounted in a double walled closed container 18, through which a thermostatically controlled liquid is circulated to maintain a fixed uniform temperature on all sides. The container also has insulating material applied to all outside walls.

The composite cell is mounted on a holder in the container in such a manner that the cell may be moved completely out of the path of the beam for the purposes of obtaining a zero correction without opening the thermostated container. Glass covered apertures 19 and 20 allow the beam to enter and leave cell container 18.

Figure 2:
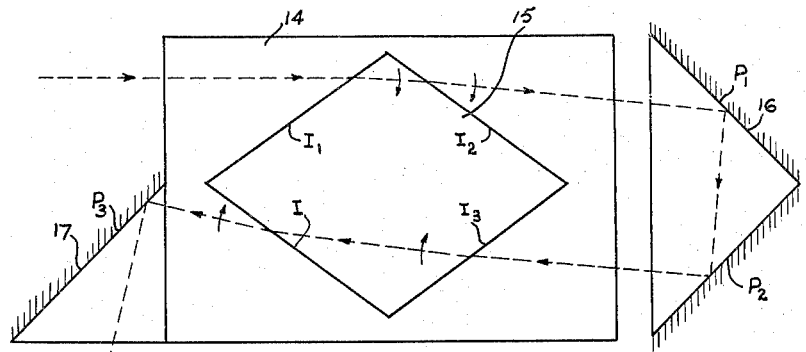
Figure 2 shows a plan view of the refractometer cell and the optical path therethrough.
Figure 3:
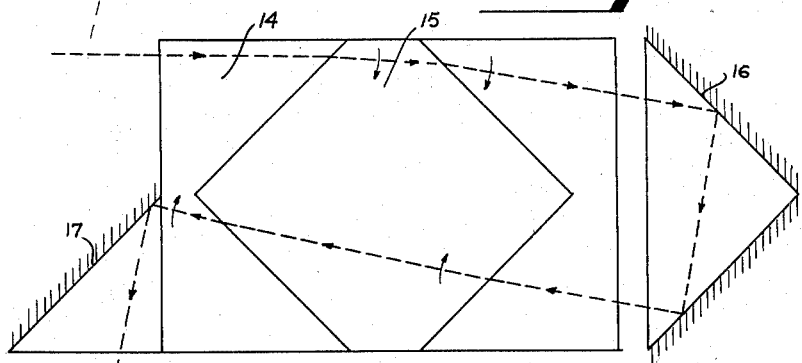
Figure 3 shows an alternate form of the refractometer cell in order to show the scope which the invention is intended to include.

It is seen that light from the source 10 falls upon the slit 11 and forms a source through which diverging light emerges, this light falling on the lens 12, the slit 11 being at the focal length of the lens 12 so that light from the slit emerges in a parallel direction from the lens, becomes monochromatic by passing through the filter 13, enters the upper portion of the solvent cell (using the orientation of Figure 1) and strikes the solvent-solution interface $I_1$ and the refractive index of the solution being greater than that of the solvent the light ray is bent clockwise (as seen in Figures 1 and 2). Emerging from the solution-solvent interface $I_2$ the difference of indices again causes the beam to be bent clockwise and it emerges from the solvent cell having been twice deflected. The beam then strikes the reflecting prism and is reflected roughly at right angles by the face $P_1$ of the prism 16, is then reflected in a direction substantially opposite to its original direction by the face $P_2$ in the prism, then bent clockwise twice in passing through the interfaces $I_3$ and $I_4$ and then strikes the face $P_3$ of the prism 17 and is reflected out of the holder 18. It is thus seen that the beam is deflected four times along this path (due to the refractive index difference between solution and solvent) and the angular deflection therefore is substantially greater than that which can be expected with any of the instruments now in use. The deflection of the beam may be measured by a travelling microscope placed in the path of the beam as it emerges from the prism 17 and from the holder.

It will be seen that the ray on emerging from the outer cell after the deflections before described might be reflected out of the plane of its path (i. e. the plane of the paper in Figure 1) and into a parallel plane which also cut the cells as seen in Figures 1 and 2. The ray could then be made to follow a similar path to that shown in those figures so that it is subjected to a total of eight deflections instead of four, and after these deflections the total deflection could then be measured. The total deflection is increased (substantially doubled) by this second travel around the cell and if desired the cell and reflecting means may be so designed that as many circuits as desired may be made, the limiting factor being the number of circuits at which the absorption of the ray is so great as to prevent the accurate observation and deflection measurement of the ray when it finally emerges from the cell.

Figure 4:
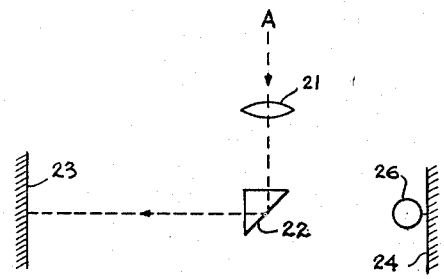
Figure 4 shows the optical lever device suggested for use with the refractometer in plan view.
Figure 5:
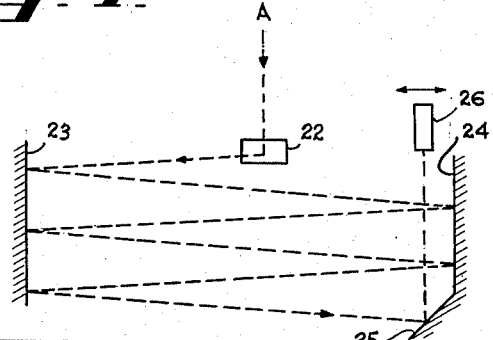
Figure 5 is an elevation of the optical lever device shown in Figure 4.

It is now proposed to describe a suggested optical lever method by which the deflection obtained by using this invention may be increased and the sensitivity of measurement measured by a travelling microscope proportionally increased. This is shown in Figures 4 and 5 wherein the beam emerging from the holder and prism 17 is shown as coming from the point A. This beam strikes a lens 21 of long focal length (such as a 3 meter lens) and thereafter impinges upon the short face of a 45° prism 22 which is rotated slightly so as to cause the previously horizontal beam to be deflected downwards at a slight angle to the horizontal. This beam is reflected back and forth between plane parallel mirrors 23 and 24 until it reaches deflecting mirror 25 situated below mirror 24, from which it is deflected to a travelling microscope 26 which views an image of slit 11 situated at an optical path length equal to the focal length of lens 21.

The horizontal displacement of the beam at this point is a magnification of the shifting of the beam due to the accumulated bending at the interfaces caused by the refractive index differences of the two solutions.

The vertical displacement of the beam is controlled by the amount of rotation of prism 22. This is determined by the distance between the parallel mirrors and the number of reflections necessary to accommodate the focal length of lens 21. It is seen that the deflection of the beam is increased by this principle. The use of the above described optical lever device in combination with the refraction cell has reduced the maximum dimension of the instrument herein described to about one quarter of that of existing differential refractometers employing an optical lever principle. Although this method is suggested for compactness, any optical lever principle may be used.

Having described the invention in detail it is proposed to note the techniques which were found advisable in the use of this apparatus.

Figure 6:
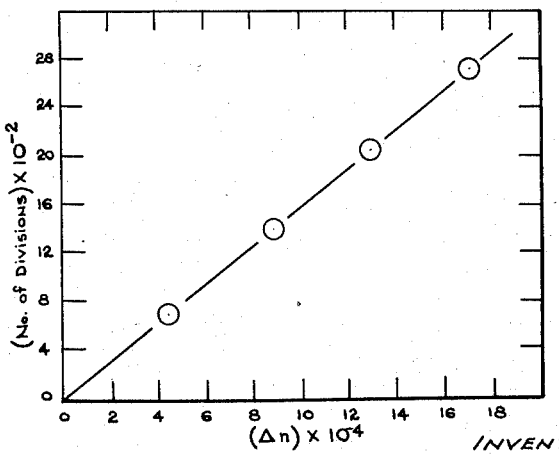
Figure 6 shows a calibration graph showing the linear relation between the difference in refractive index and the ray deflection.

The apparatus is calibrated by a convenient refractometer such as that known as the Pulfrich refractometer. In the calibration a 4% solution of cyclohexane in benzene was prepared and the desired refractive index increment obtained. The deflections for several dilutions of this solution were measured on the differential refractometer. Figure 6 shows the sensitivity and linearity of the apparatus: the ordinate showing distance on the microscope scale and the abcissa showing the difference in the refractive indices of two liquids. In obtaining the zero reading for the differential refractometer it is necessary to correct for a small shift produced when both cells are filled with solvent. This occurs if the faces of the rectangular cell are not exactly parallel to one another and it is of course very difficult to obtain this condition to a high degree of precision. The zero of this device should be checked after each reading since it has been found that in spite of the temperature control, changes in room temperature cause a shift in the zero reading. It has been found with the apparatus disclosed specifically herein, that two hours are required to attain a true temperature equilibrium.

In making measurements with this device it should be noted that the same sample of solvent must be used in making up a solution and in the measurements since appreciable differences in refractive index due to traces of impurities such as water were found with samples of reagent benzene from different bottles.

We claim:

A differential refractometer for measuring the differences between the refractive indices of two liquids comprising a substantially rectangular outer cell containing one of said liquids having side walls and end walls, an inner cell containing the other of said liquids disposed within the outer cell and having four sides, each of said sides being disposed facing a corner of the outer cell, means for transmitting a beam of light successively through one end of the outer cell, obliquely through the two sides of the inner cell which are adjacent to one side wall with the outer cell and through the other end wall of the outer cell, said means for transmitting a beam of light comprising a light source and collimating slit, a lens between the light source and the cells for condensing light from said light source into a substantially parallel beam; means for reversing and displacing the beam and directing it successively through the last mentioned end wall of the outer cell, obliquely through the two sides of the inner cell which are adjacent to the outer side wall of the outer cell and through the first mentioned end wall, and means for measuring the displacement of the beam due to the cumulative refractions of the interfaces between the liquids in the inner and outer cells, said measuring means comprising a lens for converging the beam, an optical lever including a pair of opposed parallel mirrors and a travelling microscope for viewing the image of the slit and measuring its deflection, said parallel mirrors and said microscope being disposed so that the optical path length between the lens for converging the beam and the microscope is substantially equal to the focal length of the last mentioned lens.

HARRY SHEFFER.
JOHN COLIN HYDE.
HENRY JOHN HADOW.

REFERENCES CITED

The following references are of record in the file of this patent:

UNITED STATES PATENTS

| Number | Name | Date |
|---|---|---|
| 454,989 | Sonden | June 20, 1891 |
| 740,484 | Stocoum | Oct. 6, 1903 |
| 1,264,374 | De Florez | Apr. 30, 1918 |
| 1,727,173 | Muller | Sept. 3, 1929 |
| 1,736,682 | Tuckerman | Nov. 19, 1929 |
| 1,770,355 | Doi | July 8, 1930 |
| 1,923,891 | Skaupy | Aug. 22, 1933 |
| 2,427,996 | Seaman | Sept. 23, 1947 |
| 2,445,044 | Stamm et al. | July 13, 1948 |

FOREIGN PATENTS

| Number | Country | Date |
|---|---|---|
| 22,594 | Great Britain | of 1913 |

OTHER REFERENCES

Baly, E. C. C. text; Spectroscopy—vol. 1, pages 51–53, 3rd edition, 1924—publ. Longmans, Green & Co., New York city. (Copy in Division 7.)